United States Patent
Numaguchi et al.

(10) Patent No.: US 6,686,712 B2
(45) Date of Patent: Feb. 3, 2004

(54) MOTOR NETWORK CONTROL SYSTEM

(75) Inventors: Mitsuyasu Numaguchi, Tokyo (JP); Hiroaki Watano, Tokyo (JP); Daisuke Matsuo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/121,620

(22) Filed: Apr. 15, 2002

(65) Prior Publication Data
US 2003/0085674 A1 May 8, 2003

(30) Foreign Application Priority Data
Nov. 8, 2001 (JP) ........................................ 2001-343143

(51) Int. Cl.⁷ ................................................ H02P 5/46
(52) U.S. Cl. ............................ 318/34; 318/49; 318/51; 318/113
(58) Field of Search .............................. 318/34, 41, 49, 318/51, 569, 600, 111, 112, 113

(56) References Cited

U.S. PATENT DOCUMENTS

| | | | | |
|---|---|---|---|---|
| 4,289,997 A | * | 9/1981 | Jung et al. | 318/113 |
| 4,376,913 A | * | 3/1983 | Higby | 318/85 |
| 4,825,133 A | * | 4/1989 | Tanuma et al. | 318/113 |
| 5,113,123 A | * | 5/1992 | Noser et al. | 318/106 |
| 5,473,225 A | * | 12/1995 | Miyazaki | 318/52 |
| 5,528,114 A | * | 6/1996 | Tokizaki et al. | 318/67 |
| 5,670,851 A | * | 9/1997 | Numazaki | 318/106 |
| 5,742,143 A | * | 4/1998 | Katagiri | 318/625 |
| 5,903,115 A | * | 5/1999 | Taylor | 318/34 |
| 6,188,190 B1 | * | 2/2001 | Arakawa | 318/560 |
| 6,208,104 B1 | * | 3/2001 | Onoue et al. | 318/568.11 |
| 6,281,645 B1 | * | 8/2001 | Matsukawa | 318/112 |
| 6,442,442 B1 | * | 8/2002 | Weinhofer | 700/86 |

FOREIGN PATENT DOCUMENTS

| | | |
|---|---|---|
| JP | 6-153589 | 5/1994 |
| JP | 6-165515 | 6/1994 |
| JP | 10-304696 | 11/1998 |

OTHER PUBLICATIONS

English tranlation of the detailed description of JP 10-304696, Japan Patent Office website.*
English translation of the detailed description of JP 06-153589, Japan Patent Office website.*
English translation of the detailed description of JP 06-165515, Japan Patent Office website.*

* cited by examiner

Primary Examiner—Rina I. Duda
(74) Attorney, Agent, or Firm—Sughrue Mion, PLLC

(57) ABSTRACT

A motor network control system is provided which is capable of reducing the wiring length of a power cable and in which upon replacement of a motor or an inverter of a specific motor unit, no adverse influence is exerted on the other motor units. A power cable 7 and a communication cable 8 connecting between a plurality of motor units 30a–30c, each of which includes a motor 4, an inverter 5 and a communication part 6, extend successively from a power supply 1 and a network control computer 2, respectively, to the respective motor units 30a–30c in such a manner that the motor units are connected with each other in a cascade manner from a preceding one to a following one. In addition, each of the motor units includes a connection board 11 on which an inverter 5 and a communication part 6 are installed. The power cable 7 and the communication cable 8 are connected with the respective inverters and the respective communication parts through connection terminal blocks, respectively, each of which includes a cable connector for connecting the cables from a preceding motor unit and the cables to a following motor with each other, and a terminal block fixture for detachably fixing the associated connection terminal block to the associated inverter or the associated communication part.

15 Claims, 5 Drawing Sheets

MOTOR NETWORK CONTROL SYSTEM

This application is based on Application No. 2001-343143, filed in Japan on Nov. 8, 2001, the contents of which are hereby incorporated by reference.

BACKGROUND OF THE INVENTION

1. Field of the Invention

This invention relates to a motor network control system for controlling a plurality of inverter built-in motors through network communications.

2. Description of the Related Art

FIG. 7 shows the schematic construction of such a kind of known motor network control system. In FIG. 7, the network control system as illustrated includes a power supply 1, a network control computer 2, a plurality of motor units 3a–3c, power cables 7 and a communication cable 8. Each of the motor units 3a–3c has a motor 4, a control inverter 5 and a communication part 6.

The network control computer 2 supplies control commands for performing control by the inverters 5 to the communication parts 6 of the respective motor units 3a–3c through the communication cable 8. In addition, the power supply 1 supplies electric power to the inverters 5 of the respective motor units 3a–3c through the power cables 7, respectively. The communication cable 8 is extended from the network control computer 2 so as to connect the communication parts 6 of the respective motor units 3a–3c in series with each other. On the other hand, the power cables 7 are individually connected from the power supply 1 to the inverters 5 of the respective motor units 3a–3c.

In the known motor network control system as constructed above, the power cables are individually connected from the power supply to the respective motor units, and hence in a system where the distance between the power supply and each motor unit becomes longer than the distances between the motor units for instance, the total wiring length of the power cables becomes long in comparison with the communication cable which connects the communication parts of the respective motor units in series with each other. As a result, the advantages such as the easiness in wiring operation and the reduction in the wiring length due to the series connection of the communication parts through the communication cable could not be made available to any satisfactory extent.

Moreover, in cases where the motor units are respectively arranged at locations away from one another, the number of power cables required for connecting between the power supply and the respective motor units becomes greater than that of the communication cable, and the total cable run length of the power cables increases as compared with the communication cable. As a consequence, the wiring operation becomes difficult upon installation.

The reason for not wiring the power cables to connect the inverters of the respective motor units in series with each other like the communication cable is as follows. That is, in the event that there takes place a failure in one of the plurality of motor units, requiring the replacement of the failed motor or inverter, if a power cable is arranged to connect the inverters of the respective motor units in series with each other, it is necessary to stop the supply of electric power to the normally operating motor units other than the failed one in order to carry out the replacement operation, and hence it is forced to even shut down the motor units unrelated to the failure and replacement.

SUMMARY OF THE INVENTION

The present invention is intended to obviate the various problems as referred to above, and has for its object to provide a motor network control system which is capable of reducing the wiring length of a power cable, making it easy to carry out a wiring operation, and preventing adverse influences on failure-unrelated normal motor units upon replacement of a failed motor or inverter.

Bearing the above object in mind, the present invention resides in a motor network control system comprising: a plurality of motor units each including a motor, an inverter for controlling the motor, and a communication part which receives a control command from an external network control computer connected therewith through a network and supplies the control command thus received to the inverter; a communication cable connecting between the network control computer and the communication part of each of the motor units; and a power cable extending successively from a power supply to the inverters of the respective motor units for sequentially connecting the power supply with the inverters in a cascade fashion from a preceding inverter at a power supply side to a following inverter.

In a preferred form of the present invention, the communication cable extends successively from the network control computer to the respective communication parts of the motor units to connect the communication parts with each other in a cascade fashion from a preceding communication part to a following communication part.

In another preferred form of the present invention, each of the motor units includes a connection board on which an associated one of the inverters and an associated one of the communication parts are installed, and which is detachably mounted on an associated one of the motors in such a manner that electric connection of the associated inverter and the associated communication part with the associated motor can be broken or made.

In a further preferred form of the present invention, the power cable and the communication cable are connected with the inverters or the communication parts through connection terminal blocks, respectively, and each of the connection terminal blocks includes a cable connector for electrically connecting the cables extending from a preceding motor unit and the cables extending to a following motor unit with each other, and a terminal block fixture for detachably fixing the cable connector to an inverter side or a communication part side.

In a still further preferred form of the present invention, the motor network control system further comprises a reactor inserted in the power cable in each of the motor units.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
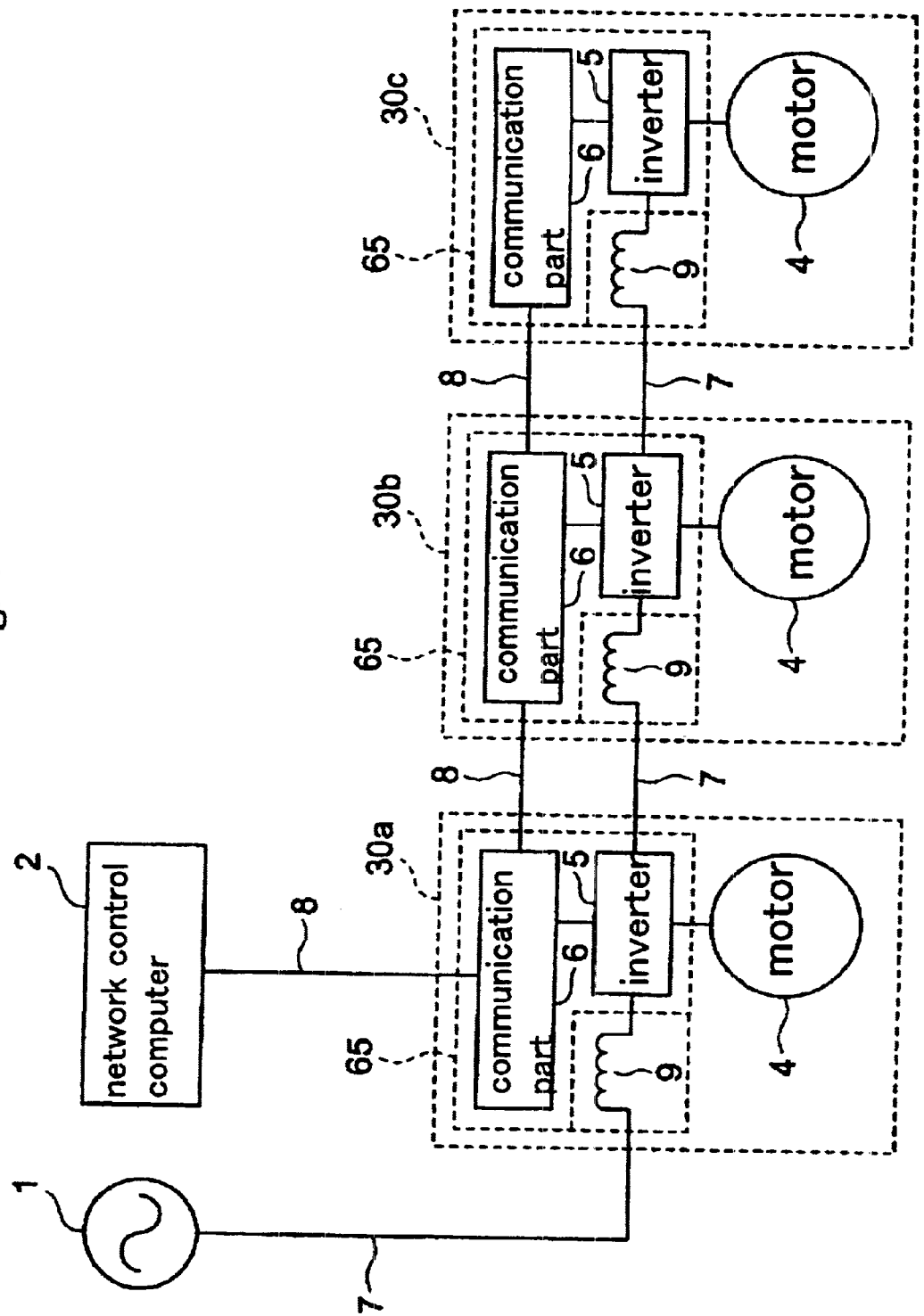
FIG. 1 is a view illustrating the schematic construction of a motor network control system according to one embodiment of this invention.

FIG. 1 shows the schematic construction of a motor network control system according to one embodiment of the present invention. In this figure, the motor network control system illustrated includes a power supply 1, a network control computer 2, a plurality of motor units 30a–30c, a power cable 7 and a communication cable 8. Each of the motor units 30a–30c has a motor 4, a control inverter 5 and a communication part 6. A reactor 9 is associated with a second embodiment of the present invention and hence its description is omitted here, but will be given later with reference to the second embodiment. Here, note that three motor units 30a–30c are shown as an example, but two or four or more motor units may instead be employed.

The power cable 7 extends sequentially from the power supply 1 to the respective inverters 5 of the motor units 30a–30c in a serial manner, so that the respective inverters 5 of the motor units 30a–30c are successively connected in series with each other in a cascade fashion from a preceding inverter 5 at the power supply 1 side to a following inverter 5. Similarly, the communication cable 8 extends sequentially from the network control computer 2 to the respective communication parts 6 of the motor units 30a–30c in a serial manner, so that the respective communication parts 6 of the motor units 30a–30c are successively connected in series with each other in a cascade fashion from a preceding communication part 6 at the network control computer 2 side to a following communication part 6. Thus, by wiring the power cable 7 and the communication cable 8 in this manner, there becomes no need for individually arranging a plurality of power cables between the power supply 1 and the respective motor units 30a–30c, whereby reduction in the total wiring length of the power cable and simplification of the wiring operation can be achieved, thus making it possible to fabricate the entire system at a reduced cost.

Figure 2:
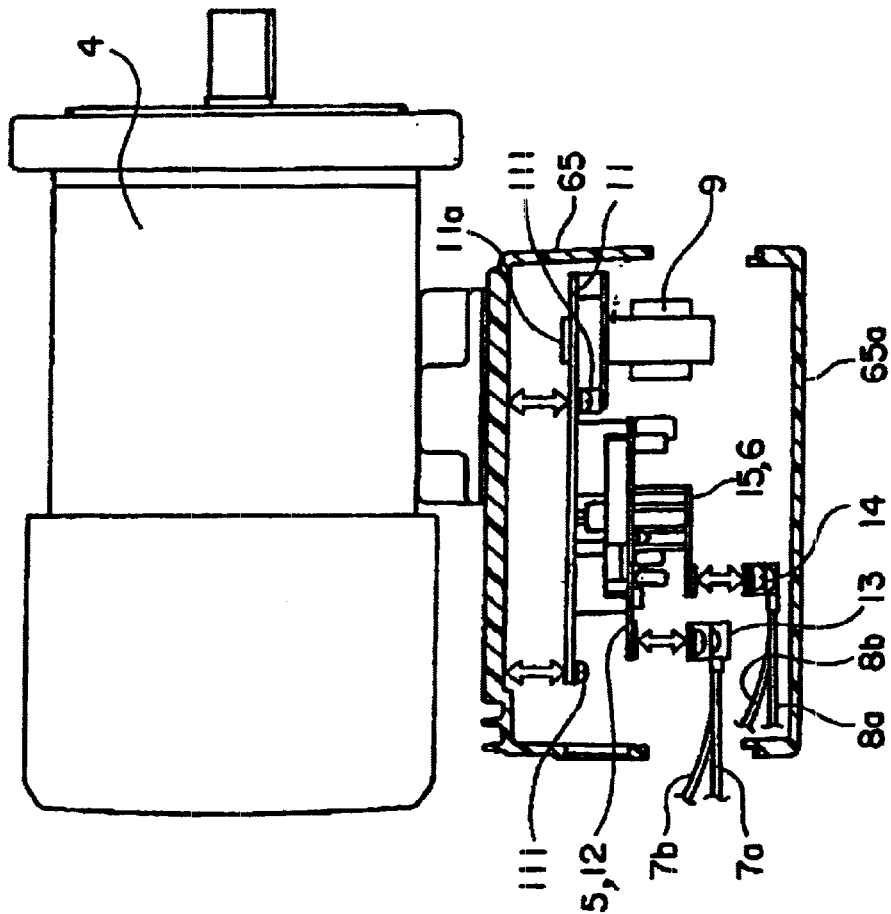
FIG. 2 is a view illustrating the construction of each motor unit of the motor network control system according to the present invention.

In addition, the inverter 5 and the communication part 6 in each of the motor units 30a–30c are received in a control box 65 installed on an associated motor 4. FIG. 2 illustrates an example of such an arrangement. Specifically, in FIG. 2, each control box 65 partially cross sectioned to show the internal contents thereof accommodates a connection board 11 having the inverter 5 and the communication part 6 integrally installed thereon, and is provided with a control box cover 65a. A reactor 9 to be described later is also installed on the connection board 11. The inverter 5 is formed on an inverter board 12, and the communication part 6 is formed on a communication board 15.

The connection board 11 is provided on its rear surface with a contact terminal 11a for electric connection with the associated motor 4, and the connection board 11 is detachably connected and secured to the control box 65 at the motor 4 side at four locations for example by means of fastening members in the form of screws 111 or the like. In this connection, note that double headed arrows in FIG. 2 show such a detachable mounting of the connection board 11. A connection terminal block 13 for connection with the power cable 7 is detachably secured to the inverter board 12 by means of fastening members such as screws or the like, and a connection terminal block 14 for connection with the communication cable 8 is detachably secured to the communication board 15 by means of fastening members such as screws or the like. Here, note that a symbol 7a on the connection terminal block 13 designates the power cable extending from the power supply 1 or from a preceding motor unit, and a symbol 7b designates the power cable extending to a following motor unit. Similarly, a symbol 8a on the connection terminal block 14 designates the communication cable extending from the network control computer 2 or from a preceding motor unit, and a symbol 8b designates the communication cable extending to a following motor unit.

Figure 3A:
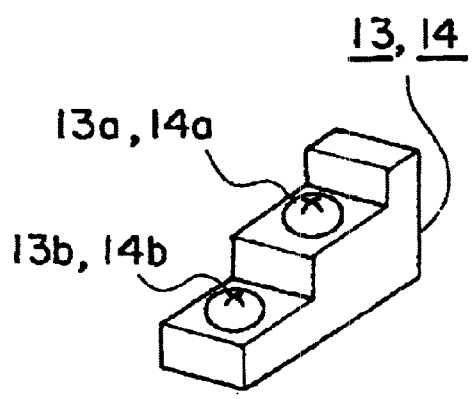
FIG. 3 is a view illustrating one example of a connection terminal block used in the present invention.
Figure 3B:
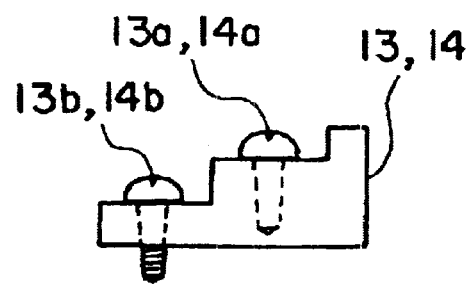

The connection terminal block 13 for the power cable 7 and the connection terminal block 14 for the communication cable 8 are basically of the similar structure, and hence a perspective view and a side elevational view thereof are shown in FIG. 3A and FIG. 3B, respectively. The connection terminal blocks 13 and 14 have cable connectors 13a and 14a and terminal block fixtures 13b and 14b, respectively. The cables extending from a preceding motor unit and the cables extending to a following motor unit are connected with the cable connectors 13a and 14a for connection with the power cable 7 and the communication cable 8, respectively, and such connections are detachably made by means of fastening members such as screws or the like. Moreover, at the terminal block fixtures 13b and 14b, the connection terminal blocks 13 and 14 themselves are detachably secured to the inverter board 12 and the communication board 15, respectively, by means of fastening members such as screws or the like.

Figure 4:
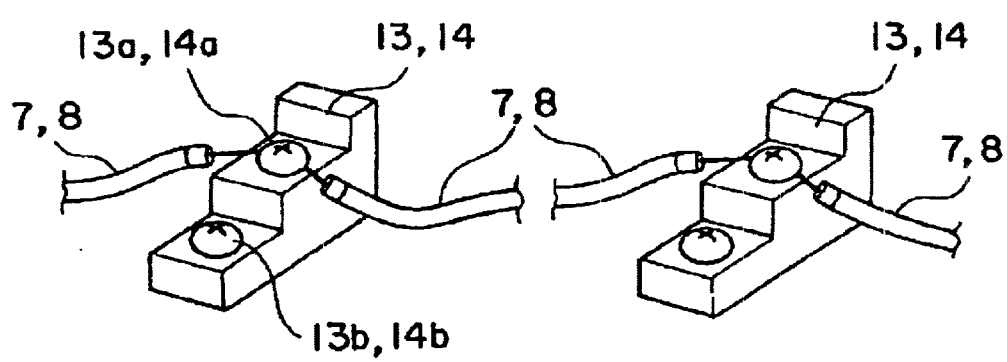
FIG. 4 is a view illustrating the connection between the connection terminal block and cables in the present invention.

FIG. 4 shows a state where a plurality of connection terminal blocks 13 and 14, with which the cables extending from a preceding motor unit and to a following motor unit are both connected, are successively connected with each other in a cascade fashion. That is, the connection terminal blocks 13 and 14 function as the input terminals in each motor unit, and also as means for providing connection between the cable from a preceding motor unit and the cable to a following motor unit.

As described above, the connection board 11 having the inverter 5 and the communication part 6 installed thereon is detachably mounted to the control box 65 at the motor 4 side, and the power cable 7 and the communication cable 8 are successively connected from a preceding motor unit to a following motor unit in a cascade manner. With such a construction, in the event that the motor 4 of a certain one of the motor units 30a–30c fails, only the failed motor 4 can be replaced with a new one merely by dismounting the connection board 11 of the failed motor unit 4, on which the inverter 5 and the communication part 6 are installed and which is attached to the control box 65 through the screws, as shown in FIG. 2, without stopping the supply of electric power to the other ones of the motor units 30a–30c, etc.

In addition to the above structure, the system of this embodiment is constructed such that the connection terminal block 13 for the power cable 7 on the inverter board 12 and the connection terminal block 14 for the communication cable 8 on the communication board 15 can be detached at the terminal block fixtures 13b and 14b from the inverter board 12 and the communication board 15, respectively, with the cables 7, 8 from a preceding motor unit and the cables 7, 8 to a following motor unit being connected with each other through the cable connectors 13a and 14a. With such a construction, in cases where the inverter 5 of a certain one of the motor units 30a–30c fails, the failed inverter 5 together with the associated connection board 11 is first removed, and then the associated connection terminal blocks 13 and 14 are removed from the inverter board 12 and the communication board 15, respectively, with the power cable 7 and the communication cable 8 being connected therewith, whereby it is possible to replace the failed inverter 5 alone while maintaining the supply of electric power and the operating state of communications.

In addition, even where there is no construction for detachably mounting the connection board 11 on the motor 4 side, by providing the above-mentioned terminal block fixtures 13b and 14b, it is possible to carry out the replacement of a failed one as a whole of the motor units 30a–30c while maintaining the supply of electric power and the operating state of communications to the other normally operating ones of the motor units 30a–30c.

Incidentally, note that the connection terminal blocks 13 and 14 are not limited to the configuration as illustrated in FIGS. 2 through 4, but they may be of any construction as long as the terminal blocks have fixtures and can be dismounted with the cables being kept in their connected states.

Figure 5:
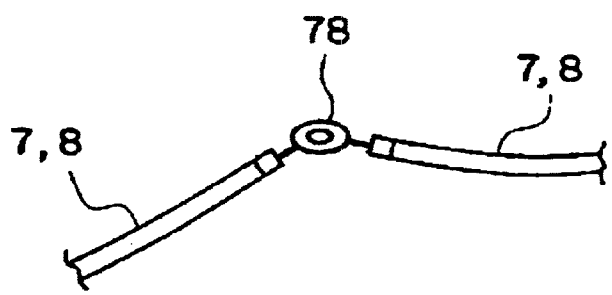
FIG. 5 is a view illustrating a preferred example of cables in the present invention.

Further, provision may be made for a ring 78 with which the power cable 7 and the communication cable 8 extending from a preceding motor unit and to a following motor unit are respectively connected as shown in FIG. 5, the ring 78 being attached to the corresponding connection terminal blocks by means of fastening members such as screws.

Figure 6:
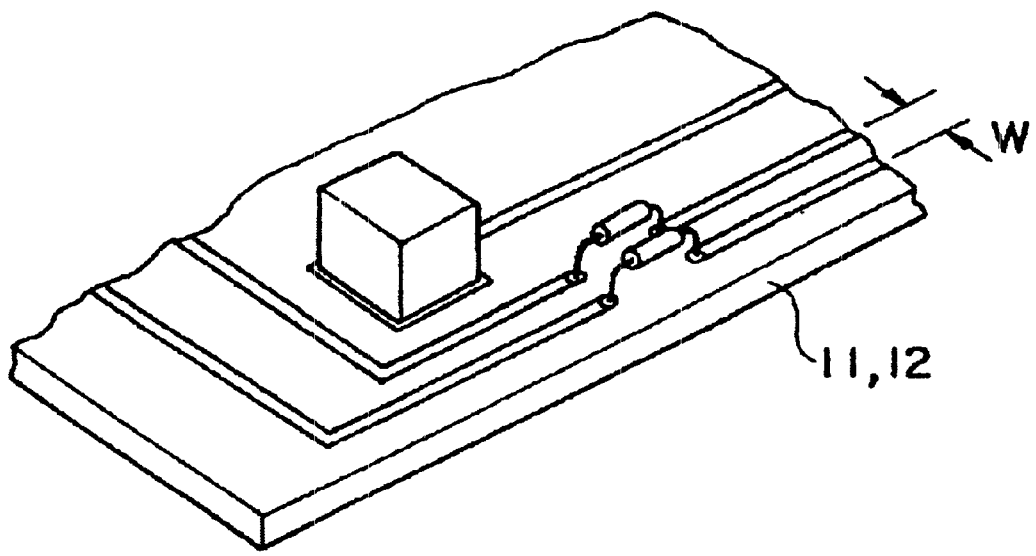
FIG. 6 is a view illustrating a board used in the present invention.
Figure 7:
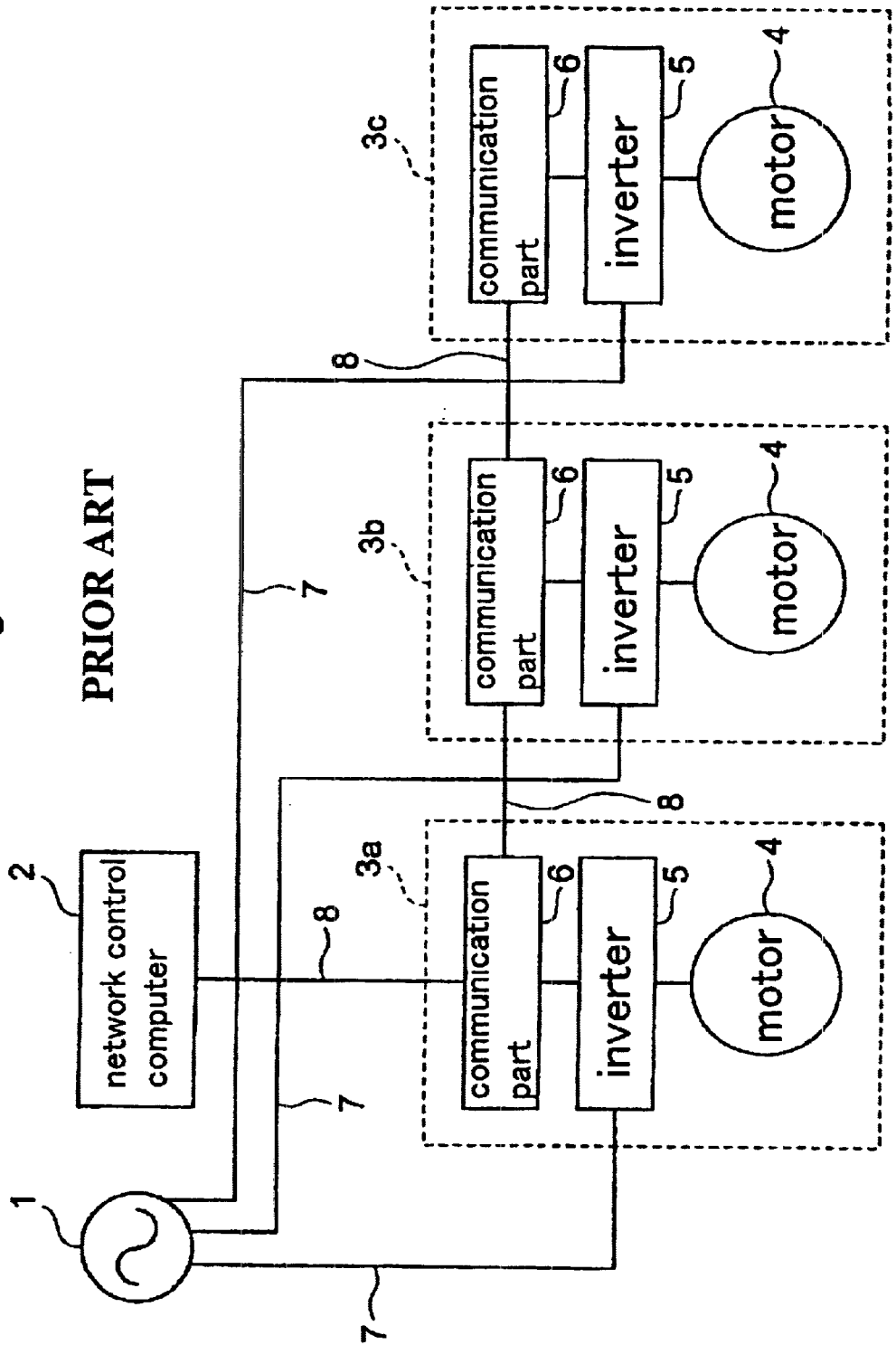
FIG. 7 is a view illustrating the schematic construction of such a kind of known motor network control system.

Besides, the motor units each having an inverter and a communication part incorporated therein according to the present invention are constructed such that the board pattern size, the distance W between power supply patterns (see FIG. 6) and the connection terminal blocks 13, 14 of the inverter board 12 and the communication board 15 are designed so as to ensure a sufficient current capacity for connection of the above-mentioned power cable 7 and communication cable 8.

Embodiment 2

Moreover, in a motor network control system according to another embodiment of the present invention, a reactor 9 is inserted in the power cable 7 in each of the motor units 30a–30c, as shown in FIG. 1. The reactor 9 may be installed on the associated connection board 11 in the control box 65 for instance, as shown in FIG. 2. With such an arrangement, even where the power cable 7 is arranged in a manner as referred to above, it is possible to suppress malfunctions due to the power supply harmonics of each inverter 5 given to the other motor units.

Here, note that the reactors 9 inserted in the power cable 7 are shown as AC reactors in FIG. 2, but can be substituted by DC reactors as well.

As described above, the present invention provides the following excellent advantages.

According to the present invention, there is provided a motor network control system which includes: a plurality of motor units each including a motor, an inverter for controlling the motor, and a communication part which receives a control command from an external network control computer connected therewith through a network and supplies the control command thus received to the inverter; a communication cable connecting between the network control computer and the communication part of each of the motor units; and a power cable extending successively from a power supply to the inverters of the respective motor units for sequentially connecting the power supply with the inverters in a cascade fashion from a preceding inverter at a power supply side to a following inverter. With such an arrangement, as compared with the case where a plurality of power cables are connected from the power supply to the motor units, respectively, the wiring length of the power cable can be reduced to simplify and facilitate the wiring operation, with the result that the entire system can be constructed at a reduced cost.

In addition, the communication cable extends successively from the network control computer to the respective communication parts of the motor units to connect the communication parts with each other in a cascade fashion from a preceding communication part to a following communication part. Thus, the wiring length of the communication cable can also be reduced to achieve simplification of the wiring operation, as a result of which the entire system can be constructed at a reduced cost.

Further, each of the motor units includes a connection board on which an associated one of the inverters and an associated one of the communication parts are installed, and which is detachably mounted on an associated one of the motors in such a manner that electric connection of the associated inverter and the associated communication part with the associated motor can be broken or made. With this arrangement, the motor of a specific motor unit can be replaced with the power supply and the communications condition to the other motor units being maintained.

Still further, the power cable and the communication cable are connected with the inverters or the communication parts through connection terminal blocks, respectively, and each of the connection terminal blocks includes a cable connector for electrically connecting the cables extending from a preceding motor unit and the cables extending to a following motor unit with each other, and a terminal block fixture for detachably fixing the cable connector to an inverter side or a communication part side. With this arrangement, a specific motor unit as a whole can be replaced with the power supply and the communication condition to the other motor units being maintained.

Moreover, if additional provision is made for the above-mentioned connection board, the inverter of a specific motor unit can be replaced with the power supply and the communication condition to the other motor units being maintained.

Besides, the motor network control system further includes a reactor inserted in the power cable in each of the motor units. Thus, it is possible to suppress malfunctions due to the power supply harmonics of the inverter in each motor unit given to the other motor units.

While the invention has been described in terms of preferred embodiments, those skilled in the art will recognize that the invention can be practiced with modifications within the spirit and scope of the appended claims.

What is claimed is:

1. A motor network control system comprising:
   a plurality of motor units each including a motor, an inverter for controlling said motor, and a communication part which receives a control command from an external network control computer connected therewith through a network and supplies the control command thus received to said inverter;
   a communication cable connecting between said network control computer and said communication part of each of said motor units; and a power cable extending successively from a power supply to said inverters of said respective motor units for sequentially connecting said power supply with said inverters in a cascade fashion from a preceding inverter at a power supply side to a following inverter.

2. The motor network control system according to claim 1, wherein said communication cable extends successively from said network control computer to said respective communication parts of said motor units to connect said communication parts with each other in a cascade fashion from a preceding communication part to a following communication part.

3. The motor network control system according to claim 1, wherein each of said motor units includes a connection board on which an associated one of said inverters and an associated one of said communication parts are installed, and which is detachably mounted on an associated one of said motors in such a manner that electric connection of said associated inverter and said associated communication part with said associated motor can be broken or made.

4. The motor network control system according to claim 2, wherein each of said motor units includes a connection board on which an associated one of said inverters and an associated one of said communication parts are installed, and which is detachably mounted on an associated one of said motors in such a manner that electric connection of said associated inverter and said associated communication part with said associated motor can be broken or made.

5. The motor network control system according to claim 2, where said power cable and said communication cable are connected with said inverters or said communication parts through connection terminal blocks, respectively, and each of said connection terminal blocks includes a cable connector for electrically connecting said cables extending from a preceding motor unit and said cables extending to a following motor unit with each other, and a terminal block fixture for detachably fixing said cable connector to an inverter side or a communication part side.

6. The motor network control system according to claim 3, where said power cable and said communication cable are connected with said inverters or said communication parts through connection terminal blocks, respectively, and each of said connection terminal blocks includes a cable connector for electrically connecting said cables extending from a preceding motor unit and said cables extending to a following motor unit with each other, and a terminal block fixture for detachably fixing said cable connector to an inverter side or a communication part side.

7. The motor network control system according to claim 4, where said power cable and said communication cable are connected with said inverters or said communication parts through connection terminal blocks, respectively, and each of said connection terminal blocks includes a cable connector for electrically connecting said cables extending from a preceding motor unit and said cables extending to a following motor unit with each other, and a terminal block fixture for detachably fixing said cable connector to an inverter side or a communication part side.

8. The motor network control system according to claim 1, further comprising a reactor inserted in said power cable in each of said motor units.

9. The motor network control system according to claim 2, further comprising a reactor inserted in said power cable in each of said motor units.

10. The motor network control system according to claim 3, further comprising a reactor inserted in said power cable in each of said motor units.

11. The motor network control system according to claim 4, further comprising a reactor inserted in said power cable in each of said motor units.

12. The motor network control system according to claim 5, further comprising a reactor inserted in said power cable in each of said motor units.

13. The motor network control system according to claim 6, further comprising a reactor inserted in said power cable in each of said motor units.

14. The motor network control system according to claim 7, further comprising a reactor inserted in said power cable in each of said motor units.

15. A motor network control system comprising:
   a plurality of motor units each including a motor, an inverter for controlling said motor, and a communication part which receives a control command from an external network control computer connected therewith through a network and supplies the control command thus received to said inverter;
   a communication cable connecting between said network control computer and said communication part of each of said motor units; and
   a power cable extending successively from a power supply to said inverters of said respective motor units such that the inverters of said respective motor units are successively connected in series with each other from a preceding inverter to a following inverter.

* * * * *